US012770175B2

(12) United States Patent
Zahid et al.

(10) Patent No.: US 12,770,175 B2
(45) Date of Patent: Oct. 20, 2026

(54) METHODS AND SYSTEMS FOR MONITORING REACTIONS OF DRIVERS IN DIFFERENT SETTINGS

(71) Applicant: Toyota Connected North America, Inc., Plano, TX (US)

(72) Inventors: Imad Zahid, Carrollton, TX (US); Shravanthi Denthumdas, Frisco, TX (US); Mark Anthony McClung, Celina, TX (US)

(73) Assignee: TOYOTA CONNECTED NORTH AMERICA, INC., Plano, TX (US)

( * ) Notice: Subject to any disclaimer, the term of this patent is extended or adjusted under 35 U.S.C. 154(b) by 753 days.

(21) Appl. No.: 18/121,901

(22) Filed: Mar. 15, 2023

(65) Prior Publication Data

US 2024/0311893 A1 Sep. 19, 2024

(51) Int. Cl.

| | |
|---|---|
| ***G06Q 30/0601*** | (2023.01) |
| ***B60R 1/00*** | (2022.01) |
| ***G01C 21/34*** | (2006.01) |

(52) U.S. Cl.
CPC ......... *G06Q 30/0631* (2013.01); *B60R 1/001* (2013.01); *G01C 21/3484* (2013.01); *B60R 2300/8006* (2013.01)

(58) Field of Classification Search
CPC ................ G06Q 30/0631; B60R 1/001; B60R 2300/8006; G01C 21/3484
See application file for complete search history.

(56) References Cited

U.S. PATENT DOCUMENTS

| | | | | |
|---|---|---|---|---|
| 7,246,050 B2 * | 7/2007 | Sheridan | G09B 9/05 | 701/1 |
| 8,694,328 B1 * | 4/2014 | Gormley | B60R 16/0373 | 705/26.7 |
| 8,894,415 B2 * | 11/2014 | Best | G09B 9/05 | 434/69 |
| 9,384,661 B1 * | 7/2016 | DeLuca | G06F 3/00 | |

(Continued)

FOREIGN PATENT DOCUMENTS

| | | | |
|---|---|---|---|
| AU | 2013101587 | A4 | 1/2014 |
| CN | 111681051 | A | 9/2020 |

(Continued)

OTHER PUBLICATIONS

Dat, Pham Minh, Nguyen Thi Hang, and Nguyen Van Huan. "A way of marketing 3D Web in e-commerce, applying at Car Showrooms period of industrial revolution 4.0." (2020). (Year: 2020).*

*Primary Examiner* — Matthew E Zimmerman
(74) *Attorney, Agent, or Firm* — DINSMORE & SHOHL LLP

(57) ABSTRACT

A vehicle system includes a steering wheel, a windshield, one or more sensors, and a controller. The controller is programmed to obtain a first driving view presented to a user via the windshield; obtain, by the one or more sensors, first response data related to a response of the user while the first driving view is presented to the user; obtain a second driving view presented to the user via the windshield; obtain, by the one or more sensors, second response data related to a response of the user while the second driving view is presented to the user; and determine a recommendation type of a vehicle for the user based on the first response data and the second response data.

17 Claims, 4 Drawing Sheets

(56) References Cited

U.S. PATENT DOCUMENTS

| | | | | |
|---|---|---|---|---|
| 10,310,600 | B2 | 6/2019 | Hong et al. | |
| 10,977,956 | B1 * | 4/2021 | Madison | A63F 13/211 |
| 2002/0161664 | A1 * | 10/2002 | Shaya | G06Q 30/0282 705/26.7 |
| 2013/0054090 | A1 | 2/2013 | Shin et al. | |
| 2014/0136187 | A1 * | 5/2014 | Wolverton | G06F 16/3329 704/9 |
| 2014/0337151 | A1 * | 11/2014 | Crutchfield | G06F 1/1605 705/17 |
| 2018/0089901 | A1 * | 3/2018 | Rober | B60K 35/00 |
| 2018/0102051 | A1 * | 4/2018 | Suthar | G08G 1/04 |
| 2018/0144549 | A1 * | 5/2018 | Gonzalez | G02B 27/0179 |
| 2019/0043278 | A1 * | 2/2019 | Stefan | G06Q 50/10 |
| 2019/0110103 | A1 * | 4/2019 | El Kaliouby | A61B 5/0022 |
| 2019/0143997 | A1 | 5/2019 | Crimando | |
| 2023/0154196 | A1 * | 5/2023 | Choi | G06V 20/56 382/104 |

FOREIGN PATENT DOCUMENTS

| | | | | | |
|---|---|---|---|---|---|
| CN | 112541663 | A | | 3/2021 | |
| CN | 114926244 | A | | 8/2022 | |
| CN | 115170219 | A | | 10/2022 | |
| DE | 102009058491 | A1 | * | 6/2011 | G09B 9/05 |
| DE | 102013021138 | A1 | * | 6/2015 | G06F 30/15 |
| JP | 2022107181 | A | * | 7/2022 | |
| KR | 102114843 | B1 | | 5/2020 | |
| KR | 102437046 | B1 | * | 8/2022 | G06Q 30/08 |

* cited by examiner

METHODS AND SYSTEMS FOR MONITORING REACTIONS OF DRIVERS IN DIFFERENT SETTINGS

TECHNICAL FIELD

The present disclosure relates to methods and systems for monitoring reactions of drivers in different settings, and more particularly, to methods and systems for monitoring reactions of drivers in different settings and recommending vehicles based on the reactions of drivers.

BACKGROUND

Potential vehicle customers may test drive vehicles and select their preferred vehicles based on the test driving. For example, a customer visits a dealership, drives different vehicles, and selects one of the vehicles. Even with the test driving at the dealership, the customer may not adequately select a vehicle that fits best for her. Specifically, the customer thinks she prefers one type of a vehicle, but the customer actually prefers a different type of a vehicle. In addition, because the customer can test drive vehicles only for a limited period of time in a limited area, the customer may not fully experience various vehicles in different settings.

Therefore, alternative methods for providing different driving experiences and suggesting vehicle options to potential customers are desired.

SUMMARY

According to one embodiment of the present disclosure, a vehicle system includes a steering wheel, a windshield, one or more sensors, and a controller programmed to: obtain a first driving view presented to a user via the windshield; obtain, by the one or more sensors, first response data related to a response of the user while the first driving view is presented to the user; obtain a second driving view presented to the user via the windshield; obtain, by the one or more sensors, second response data related to a response of the user while the second driving view is presented to the user; and determine a recommendation type of a vehicle for the user based on the first response data and the second response data.

According to another embodiment of the present disclosure, a method includes obtaining a first driving view presented to a user; obtaining, by one or more sensors, first response data related to a response of the user while the first driving view is presented to the user; obtaining a second driving view presented to the user; obtaining, by the one or more sensors, second response data related to a response of the user while the second driving view is presented to the user; and determining a recommendation type of a vehicle for the user based on the first response data and the second response data.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

In embodiments, the present system collects a user's feelings and emotional response of different types of vehicles by using gaze tracking and other sensors to gauge an emotional response of the user to a driving environment. The user's feelings and emotional responses may be collected while the user is test driving a vehicle either physically or in a virtual environment. According to the present disclosure, the knowledge of a person's true feelings for various vehicles are collected, and the knowledge is used to recommend a vehicle that is preferred by the person.

Figure 1A:
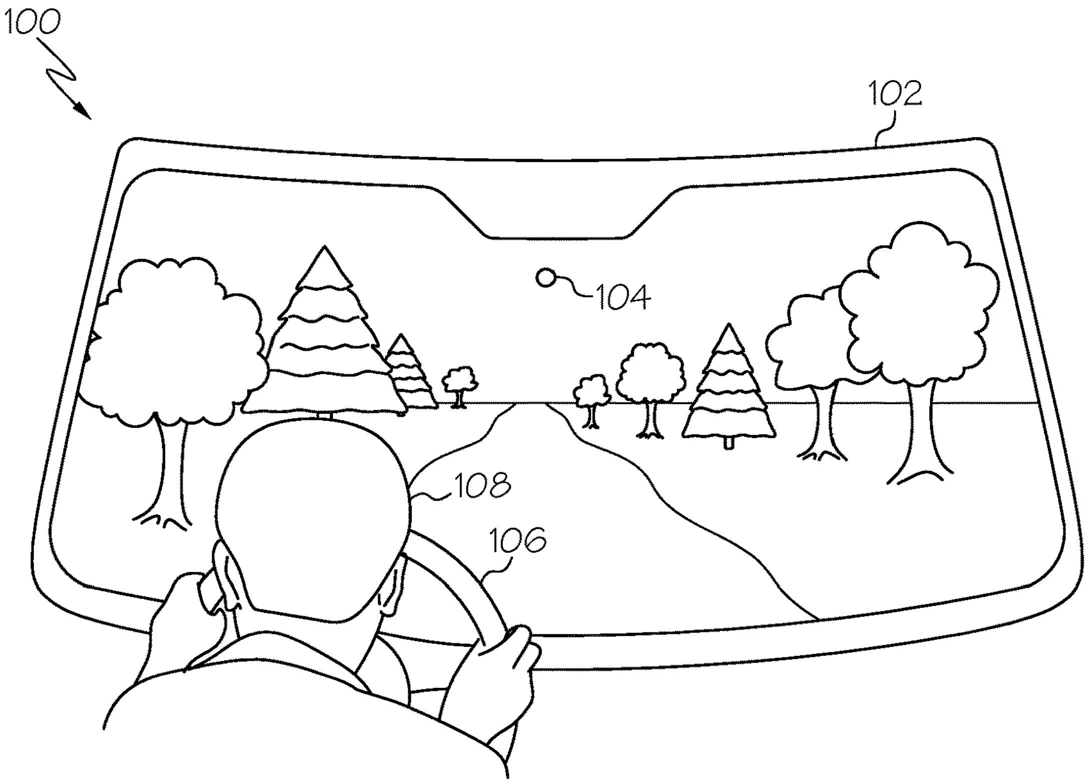
FIG. 1A depicts an example vehicle system for collecting the feelings and emotional response of a user according to one or more embodiments shown and described herewith.

Referring now to FIG. 1A, an example vehicle system for collecting the feelings and emotional response of a user is depicted. The vehicle system 100 may include a windshield 102, a camera 104, and a steering wheel 106. A user 108 may be within the vehicle system 100, e.g., a simulated vehicle system or an actual vehicle, and drive a vehicle by operating the steering wheel 106 and accelerators/brakes of the vehicle. The camera 104 may be directed to the user and capture images of the user 108 and the vehicle system 100 may process the images to determine feelings and/or emotional response of the user 108. The steering wheel 106 may include a contact sensor to detect the presence of the hands of the user 108 on the steering wheel 106. The steering wheel 106 may include a pressure sensor to detect the pressure applied by the hands for the user 108.

In embodiments, the vehicle system 100 may be a virtual vehicle driving system. The windshield 102 may be a virtual reality (VR) screen that displays a video. The VR screen may illustrate various views such as an off-road view, a track view, a highway view, a city view, a suburb view, a rural view, steep road view, a straight road view, a curved road view, and the like. Videos displayed on the windshield 102 may be pre-recorded videos of real views or simulated views. The pre-recorded videos or simulated views may be stored in the vehicle system 100.

Figure 1B:
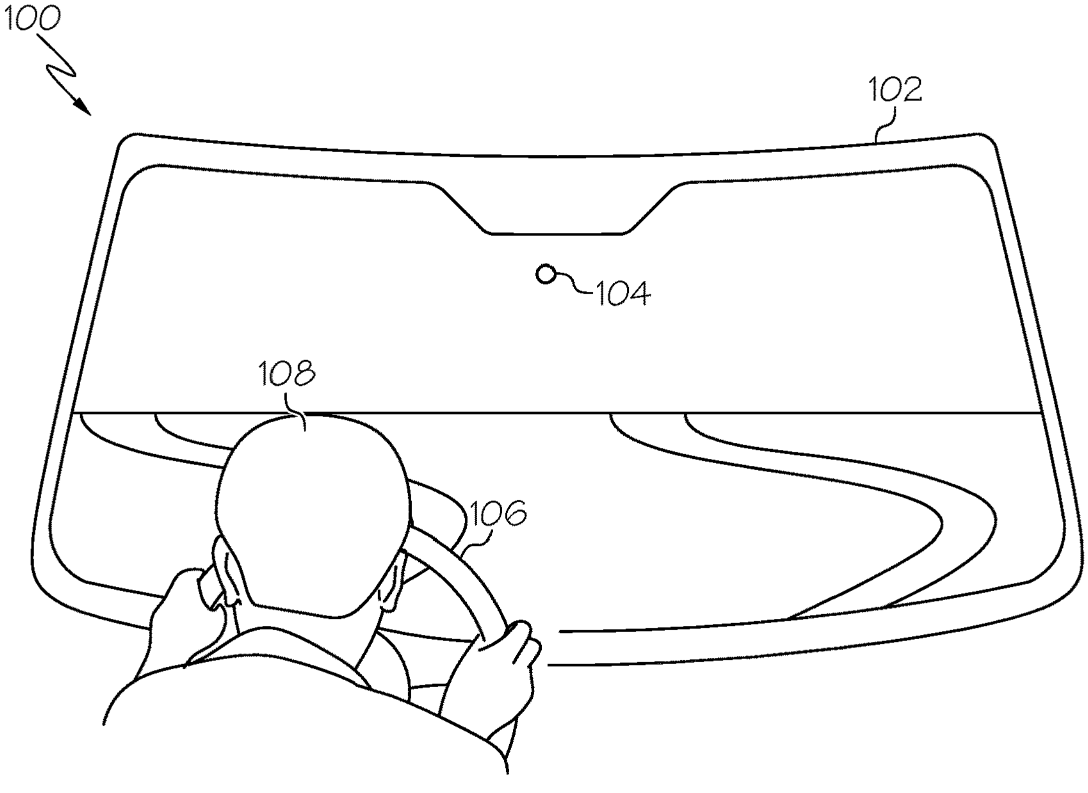
FIG. 1B depicts an example vehicle system for collecting the feelings and emotional response of a user according to one or more embodiments shown and described herewith.

In this example, the VR screen may illustrate a simulated off-road view. The camera 104 may capture images of the user 108 while the simulated off-road view is displayed on the windshield 102. The windshield 102 may display a different simulated view after displaying the simulated off-road view. By referring to FIG. 1B, the windshield 102 display a track view. In embodiments, the vehicle system 100 may switch from displaying the simulated off-road view to displaying a track view in response to a user input. For example, the user 108 may push a physical button or an animated button on a touch screen for changing the view of the windshield 102 and the windshield 102 may change the view. In some embodiments, the vehicle system 100 may switch from displaying the simulated off-road view to displaying the track view after sufficient response data of the user 108 is collected regarding the currently displayed view. For example, the vehicle system 100 may determine whether an amount of response data of the user 108 is greater than a predetermined amount, and switch from displaying the off-road view to displaying the track view when it is determined that the amount of response data of the user 108 is greater than a predetermined amount. The response data may include captured images of the user 108, audio recorded by a microphone of the vehicle, the temperature of the user 108 detected by a temperature sensor, a pressure ono the steering wheel 106 by the hands of the user 108, and the like. In some embodiments, the vehicle system 100 may switch from displaying the simulated off-road view to displaying the track view after displaying the simulated off-road view for a predetermined period of time, e.g., 10 minutes, 30 minutes, and the like.

In some embodiments, the vehicle system 100 may be an actual vehicle driving system. The windshield 102 may be a normal window that shows the external view of a vehicle. The vehicle system 100 may include one or more cameras, e.g., forward facing cameras, that capture images of an external view of the vehicle. The vehicle system 100 may process and analyze the images to determine a type of the current external view of the vehicle. For example, the vehicle system 100 may perform image processing on the captured images and identify dirt on the way, and determine that the vehicle is driving off-road. As another example, the vehicle system 100 may perform image processing on the captured images and identify road signs such as a speed limit or a highway sign, and determine that the vehicle is driving highway. As another example, the vehicle system 100 may perform image processing on the captured images to identify a paved road, and determine that the vehicle is driving a paved road. In some embodiments, the vehicle system 100 may obtain the current location of the vehicle and identify the type of the current road based on the current location of the vehicle. For example, the vehicle may obtain a GPS signal, identify the current location of the vehicle on a road map based on the GPS signal, and determine the type of the road the vehicle is driving based on the current location.

Figure 2:
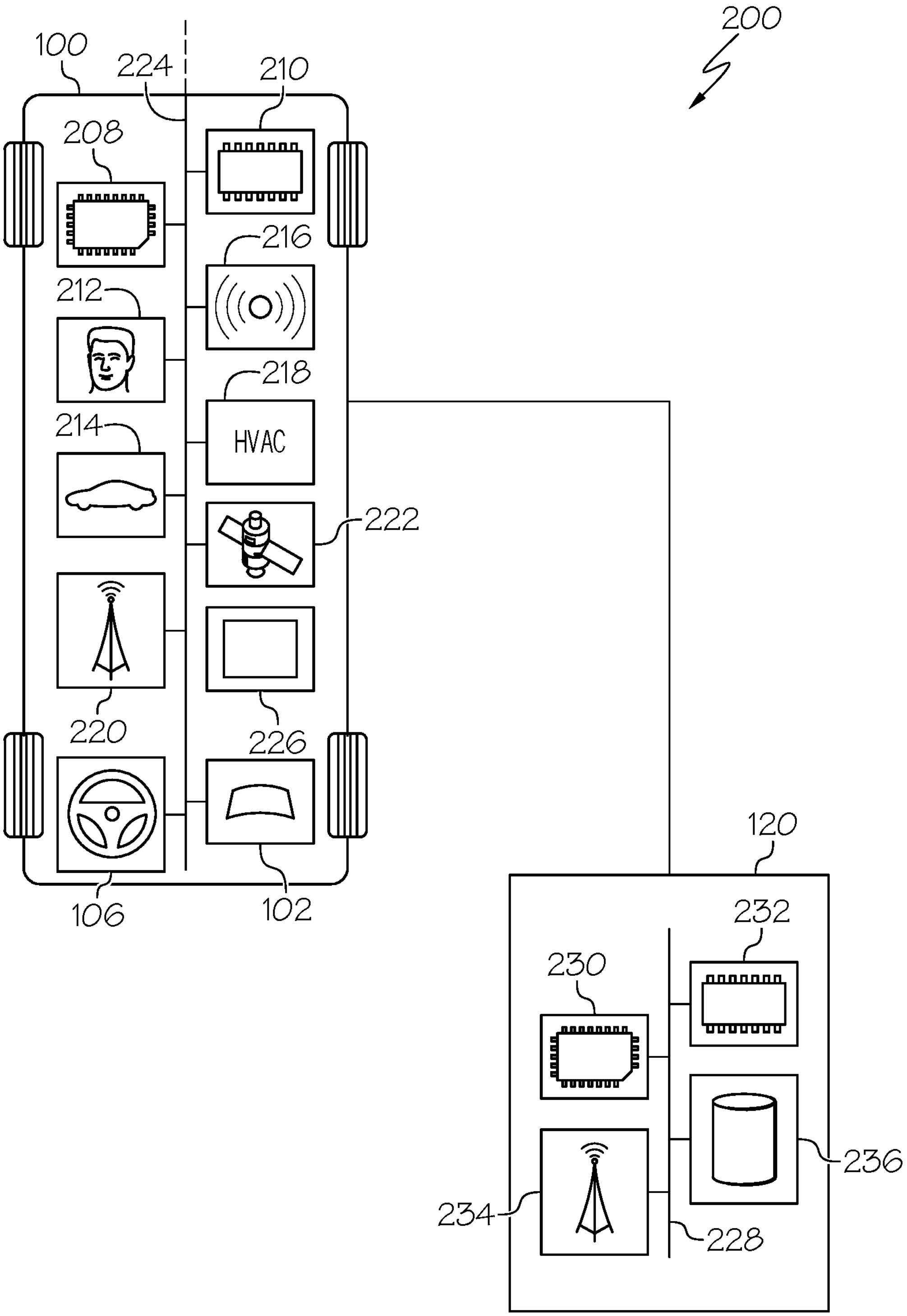
FIG. 2 depicts a schematic diagram of an example vehicle system for collecting the feelings and emotional response of a user according to one or more embodiments shown and described herewith.

Referring now to FIG. 2, a schematic diagram of an example system 200 is depicted. In particular, the vehicle system 100 and a server 120 are depicted. The vehicle system 100 may include the windshield 102, the steering wheel 106, a processor component 208, a memory component 210, a user gaze monitoring component 212, a driving assist component 214, a sensor component 216, a HVAC system 218, a network connectivity component 220, a satellite component 222, and an interface 226. The vehicle system 100 may also include a communication path 224 that communicatively connects the various components of the vehicle system 100.

The processor component 208 may include one or more processors that may be any device capable of executing machine readable and executable instructions. Accordingly, each of the one or more processors of the processor component 208 may be a controller, an integrated circuit, a microchip, or any other computing device. The processor component 208 may be programmed to perform the steps illustrated in FIG. 3, which will be described further in detail.

The processor component 208 is coupled to the communication path 224 that provides signal connectivity between the various components of the connected vehicle. Accordingly, the communication path 224 may communicatively couple any number of processors of the processor component 208 with one another and allow them to operate in a distributed computing environment. Specifically, each processor may operate as a node that may send and/or receive data. As used herein, the phrase "communicatively coupled" means that coupled components are capable of exchanging data signals with one another such as, e.g., electrical signals via a conductive medium, electromagnetic signals via air, optical signals via optical waveguides, and the like.

Accordingly, the communication path 224 may be formed from any medium that is capable of transmitting a signal such as, e.g., conductive wires, conductive traces, optical waveguides, and the like. In some embodiments, the communication path 224 may facilitate the transmission of wireless signals, such as Wi-Fi, Bluetooth®, Near-Field Communication (NFC), and the like. Moreover, the communication path 224 may be formed from a combination of mediums capable of transmitting signals. In one embodiment, the communication path 224 comprises a combination of conductive traces, conductive wires, connectors, and buses that cooperate to permit the transmission of electrical data signals to components such as processors, memories, sensors, input devices, output devices, and communication devices. Accordingly, the communication path 224 may comprise a vehicle bus, such as for example a LIN bus, a CAN bus, a VAN bus, and the like. Additionally, it is noted that the term "signal" means a waveform (e.g., electrical, optical, magnetic, mechanical, or electromagnetic), such as DC, AC, sinusoidal-wave, triangular-wave, square-wave, vibration, and the like, capable of traveling through a medium.

The memory component 210 is coupled to the communication path 224 and may contain one or more memory modules comprising RAM, ROM, flash memories, hard drives, or any device capable of storing machine readable and executable instructions such that the machine readable and executable instructions can be accessed by the processor component 208. The machine readable and executable instructions may comprise logic or algorithms written in any programming language of any generation (e.g., 1GL, 2GL, 3GL, 4GL, or 5GL) such as, e.g., machine language, that may be directly executed by the processor, or assembly language, object-oriented languages, scripting languages, microcode, and the like, that may be compiled or assembled into machine readable and executable instructions and stored on the memory component 210. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components. The memory component 210 may store simulated videos showing different views such as an off-road view, a track view, a highway view, a city view, a suburb view, a rural view, steep road view, a straight road view, and a curved road view.

The vehicle system 100 may also include a user gaze monitoring component 212. The gaze monitoring component 212 may include imaging sensors such as a camera or an infrared (IR) blaster. For example, the gaze monitoring component 212 may be the camera 104 in FIGS. 1A and 1B. The data gathered by the gaze monitoring component 212 may be analyzed by the processor component 208 to determine a level of cognitive engagement of a user under a current environment, or a facial expression of the user. This analysis may be based on the user's head position, eye position, etc. The data and the level of cognitive engagement under a certain environment may be stored in a user profile of the user. In some embodiments, the vehicle system 100 may transmit the data gathered by the gaze monitoring component 212 to the server 120, and the processor 230 of the server 120 may analyze the data to determine a level of cognitive engagement of a user under a current environment.

The vehicle system 100 may also include a driving assist component 214, and the data gathered by the sensor component 216 may be used by the driving assist component 214 to assist the navigation of the vehicle. The data gathered by the sensor component 216 may also be used to perform various driving assistance including, but not limited to advanced driver-assistance systems (ADAS), adaptive cruise control (ACC), cooperative adaptive cruise control (CACC), lane change assistance, anti-lock braking systems (ABS), collision avoidance system, automotive head-up display, and the like. The driving assistance may be turned on or off by the user. Information about turning on or off the driving assistance by the user under a certain environment may be stored in the user profile for the user.

The vehicle system 100 also comprises the sensor component 216. The sensor component 216 is coupled to the communication path 224 and communicatively coupled to the processor component 208. The sensor component 216 may include, e.g., LiDAR sensors, RADAR sensors, optical sensors (e.g., cameras), laser sensors, proximity sensors, location sensors (e.g., GPS modules), and the like. In embodiments, the sensor component 216 may monitor the surroundings of the vehicle and may detect other vehicles and/or traffic infrastructure. The sensor component 216 may be a forward facing camera that captures a front view of the vehicle.

The vehicle system 100 also comprises a network connectivity component 220 that includes network interface hardware for communicatively coupling the vehicle system 100 to the server 120. The network connectivity component 220 can be communicatively coupled to the communication path 224 and can be any device capable of transmitting and/or receiving data via a network or other communication mechanisms. Accordingly, the network connectivity component 220 can include a communication transceiver for sending and/or receiving any wired or wireless communication. For example, the network interface hardware of the network connectivity component 220 may include an antenna, a modem, a LAN port, a Wi-Fi card, a WiMAX card, a cellular modem, near-field communication hardware, satellite communication hardware, and/or any other wired or wireless hardware for communicating with other networks and/or devices.

The vehicle system 100 also comprises an HVAC system 218. The HVAC system 218 may be controlled by the user, and the history of the control of the HVAC system 218 may be stored in a user profile of the user. For example, if a user sets the temperature of 70 degrees Fahrenheit for the HVAC system 218 when an external temperature is 40 degrees Fahrenheit, the temperature setting information along with the external temperature information may be stored in the user profile of the user. As another example, if a user turns off the HVAC system 218 and opens one or more windows when an external temperature is between 65 degrees and 75 degrees Fahrenheit, the turn-off setting along with the external temperature information may be stored in the user profile of the user.

A satellite component 222 is coupled to the communication path 224 such that the communication path 224 communicatively couples the satellite component 222 to other modules of the vehicle system 100. The satellite component 222 may comprise one or more antennas configured to receive signals from global positioning system satellites. Specifically, in one embodiment, the satellite component 222 includes one or more conductive elements that interact with electromagnetic signals transmitted by global positioning system satellites. The received signal is transformed into a data signal indicative of the location (e.g., latitude and longitude) of the satellite component 222, and consequently, the vehicle system 100.

The vehicle system 100 may also include a data storage component that may be included in the memory component 210. The data storage component may store data used by various components of the vehicle system 100. In addition, the data storage component may store data gathered by the sensor component 216, received from the server 120, and/or received from other vehicles.

The vehicle system 100 may also include an interface 226. The interface 226 may allow for data to be presented to a human driver and allow for data to be received from the driver. For example, the interface 226 may include a screen to display information to a driver, speakers to present audio information to the driver, and a touch screen that may be used by the driver to input information. In other examples, the vehicle system 100 may include other types of interfaces 226. The interface may output information that the vehicle system 100 received from the server 120. In some embodiments, the vehicle system 100 may be communicatively coupled to the server 120 by a network. The network may be a wide area network, a local area network, a personal area network, a cellular network, a satellite network, and the like.

The server 120 comprises a processor 230, a memory component 232, a network connectivity component 234, a data storage component 236, and a communication path 228. Each server component is similar in features to its connected vehicle counterpart, described in detail above. The data storage component 236 may store user profiles for users who operated the vehicle system 100. The user profiles may include driving history of the user in association with user response information, vehicle driving settings, and the like.

Figure 3:
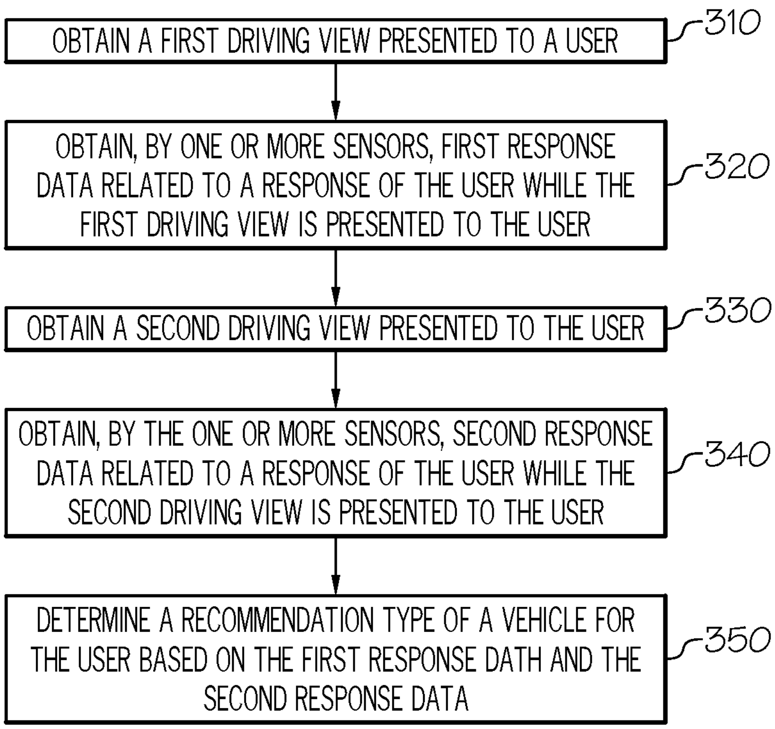
FIG. 3 depicts a flowchart of an example method for obtaining user responses while different views are presented to the user and recommending a vehicle type for the user based on the response according to one or more embodiments shown and described herewith.

FIG. 3 depicts a flowchart of an example method for obtaining user responses while different views are presented to the user and recommending a vehicle type for the user based on the response.

In step 310, the vehicle system obtains a first driving view presented to a user. In embodiments, by referring to FIG. 1A, the first driving view may be a simulated view displayed on the windshield 102. The simulated view may be a simulated virtual reality video played on the windshield 102. The first driving view may be stored in the vehicle system 100, and the vehicle system 100 identifies that the first driving view is played on the windshield 102. The user 108 may be test driving a vehicle while the first driving view is presented. For example, the simulated view may be an off-road view. As another example, the simulated view may be other view such as a track view, a highway view, a city view, a suburb view, a rural view, steep road view, a straight road view, or a curved road view.

In some embodiments, the first driving view may be a real external view of a vehicle. The vehicle system obtains a first driving view using a camera, for example, a forward-facing camera. The vehicle system processes the images captured by the camera to determine the first driving view. For example, the vehicle system 100 may perform image processing on the captured images and identify dirt on the way, and determine that the vehicle is driving off-road. As another example, the vehicle system 100 may perform image processing on the captured images and identify road signs such as a speed limit or a highway sigh, and determine that the vehicle driving highway. As another example, the vehicle system 100 may perform image processing on the captured images to identify a paved road, and determine that the vehicle is driving a paved road. In some embodiments, the vehicle system 100 may obtain the current location of the vehicle and identify the type of the current road based on the current location of the vehicle. For example, the vehicle may obtain a GPS signal, identify the current location of the vehicle on a road map based on the GPS signal, and determine the type of the road the vehicle is driving based on the current location.

In step 320, the vehicle system obtains, by one or more sensors, first response data related to a response of the user while the first driving view is presented to the user. For example, the vehicle system may obtain gaze information of the user and/or facial expression as the first response data. Specifically, the vehicle system obtains images of the user captured by an in-vehicle camera, such as the camera 104 in FIG. 1A, and processes the images to obtain gaze information of the user and/or facial expressions of the user. The gaze information may indicate whether the user is paying attention to driving, e.g., facing forward, or is not paying attention to driving, e.g., looking at inside of the vehicles such as a human machine interface, looking at other passenger in the vehicle, and the like. The facial expressions may include positive feelings such as smiling, excitement, and the like, or negative feelings such as boring, angry, and the like.

As another example, the vehicle system may obtain the body temperature of the user as the first response data. Specifically, the vehicle system may obtain the body temperature of the user by using a temperature sensor, such as an infrared temperature sensor.

As another example, the vehicle system may obtain audio information of the user such as a pitch and/or a volume of the voice of the user as the first response data. Specifically, the vehicle system may obtain audio recorded by a microphone of the vehicle and process the audio to obtain pitch and/or volume of the audio.

As another example, the vehicle system may obtain information about the user's engagement with the steering wheel as the first response data. Specifically, the vehicle system may obtain pressure information on the steering wheel by the hands of the user by using one or more pressure sensors on the steering wheel. The pressure information may include information on how many hands of the user are holding the steering and/or information on how hard the user is holding the steering wheel. As another example, the vehicle system may obtain information about the heart rate of the user. Specifically, the steering wheel of the vehicle may include a heart rate sensor and the vehicle system may obtain the heart rate of the user when the user is holding the steering wheel.

In step 330, the present system obtains a second driving view presented to the user. In embodiments, by referring to FIG. 1B, the second driving view may be a simulated view displayed on the windshield 102. For example, the second driving view may be a track view. As another example, the simulated view may be other view such as a highway view, a city view, a suburb view, a rural view, steep road view, a straight road view, or a curved road view. In some embodiments, the second driving view may be a real outside view of a vehicle obtained by a camera such as a forward-facing camera. In some embodiments, the vehicle system 100 may obtain the current location of the vehicle and identify the type of the current road based on the current location of the vehicle.

In embodiments, the vehicle system may switch from displaying the first driving view to displaying the second driving view when a certain condition is met. For example, the vehicle system determines whether an amount of the first response data is greater than a predetermined amount. Specifically, the vehicle system may determine whether the size of the collected images or video of the user is greater than a predetermined data size, determine whether the size of collected audio of the user is greater than a predetermined data size, or determine whether the size of the collected pressure data or heart rate data is greater than a predetermined data size. If the amount of the first response data is greater than the predetermined amount, the vehicle system may switch from displaying the first simulated driving view to displaying the second simulated driving view in order to obtain second response data while presenting the second simulated driving view. In some embodiments, the vehicle system may switch from displaying the first driving view to displaying the second driving view when receiving a manual input from the user. The manual input from the user requests change of the current view. In some embodiments, the vehicle system may switch from displaying the first driving view to displaying the second driving view after the vehicle drives a predetermined amount of distance, e.g., 5 miles, 10 miles, 20 miles, etc.

In step 340, the present system obtains, by the one or more sensors, second response data related to a response of the user while the second driving view is presented to the user. The second response data may include gaze information of the user, facial expression information of the user, information about the user's engagement with the steering wheel, heart rate information of the user, audio information of the user, and the like.

In step 350, the present system determines a recommendation type of a vehicle for the user based on the first response data and the second response data. In embodiments, the present system compares the first response data and the second response data and determines a recommendation type of a vehicle. For example, the first response data may be facial expressions including positive feelings such as smiling and the second response data may be facial expressions including negative feelings such as frowning. The first response data was collected while the vehicle system presents an off-road view, and the second response data was collected while the vehicle system presents a track view. Then, the present system determines that the user prefers driving a vehicle in off-road environment, and recommends a vehicle suited for an off-road, e.g., a pick-up truck, to the user after the test-driving. The present system may store the recommendation type of a vehicle in the user profile of the user.

As another example, the first response data and the second response data may be gaze information of a user. The first response data was collected while the vehicle system presents a steep road view, and the second response data was collected while the vehicle system presents a flat road view. The first response data indicates that the user faces forward and is less distracted, and the second response data indicates that the user is frequently distracted and faces different directions other than a forward driving direction. Then, the present system determines that the user prefers driving a vehicle on a steep road, and recommends a vehicle suited for a steep road to the user after the test-driving.

As another example, the first response data and the second response data may be information about the user's engagement with the steering wheel. The first response data was collected while the vehicle system presents an off-road view, and the second response data was collected while the vehicle system presents a track view. The first response data indicates that the user more actively engages with the steering wheel, e.g., holding the steering with two hands for a long period of time, than the user's engagement indicated by the second response data. Then, the present system determines that the user prefers driving a vehicle in off-road environment, and recommends a vehicle suited for an off-road, e.g., a pick-up truck, to the user after the test-driving.

Figure 4:
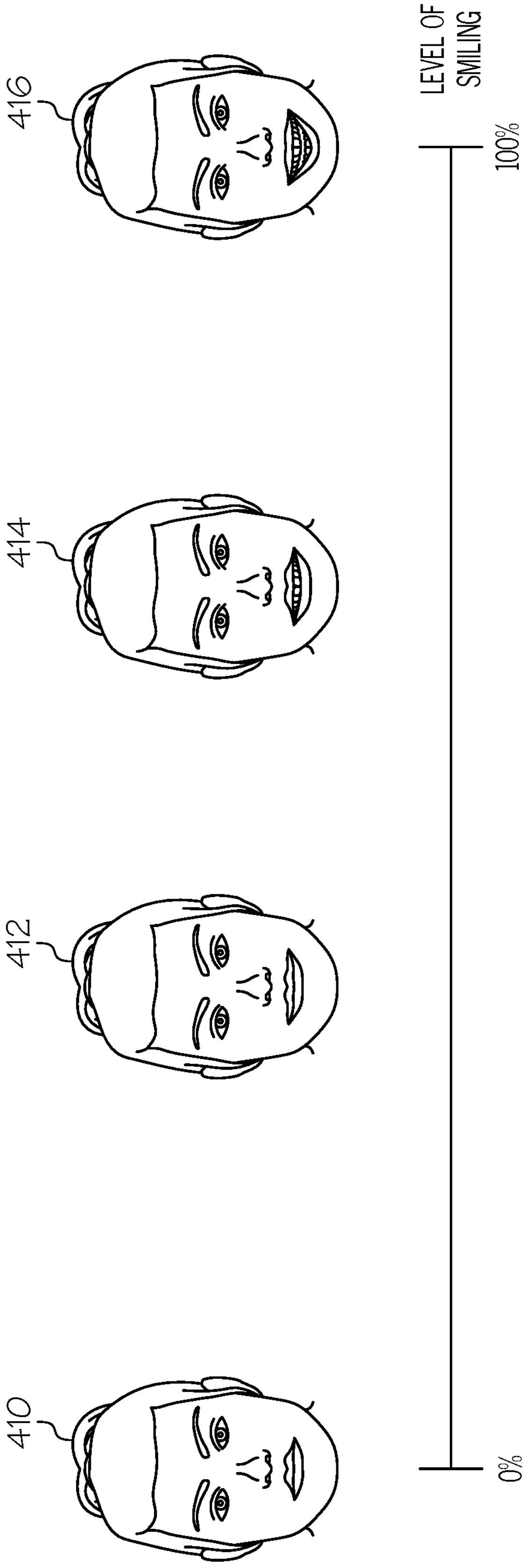
FIG. 4 depicts exemplary facial expressions showing different levels of facial expression, according to one or more embodiment shown and described herein.

In embodiments, the present system processes the first response data to determine a first level of cognitive engagement, processes the second response data to determine a second level of cognitive engagement, and determines the recommendation type of the vehicle based on a comparison of the first level of cognitive engagement and the second level of cognitive engagement. For example, each of the first level of cognitive engagement and the second level of cognitive engagement may be a level of smiling of the user. FIG. 4 depicts exemplary facial expressions showing different levels of facial expression, according to one or more embodiment shown and described herein. In FIG. 4, four samples of captured images 410, 412, 414, and 416 are presented. The processor component 208 may process the captured images 410, 412, 414, and 416 to determine one or more facial expression parameters for each of the captured images. Then, the processor component 208 may determine the type of a facial expression of the captured images based on the one or more facial expression parameters. For example, the processor component 208 may determine that the captured image 410 is a neutral facial expression, and the captured images 412, 414, and 416 are smiling facial expressions.

The processor component 208 may determine a level of smiling for captured images 412, 414, and 416 based on the one or more facial expressions. For example, the processor component 208 may determine the level of smiling for captured images 412, 414, and 416 based on the number of teeth shown in the image, the size of the teeth on the image, the contour of an outer lip, the opening of a mouth, the shape of eyes, etc. In this example, the processor component 208 may determine the level of smiling for captured image 412 as 30%, the level of smiling for captured image 414 as 60%, and the level of smiling for captured image 416 as 100%. The processor component 208 may determine that the level of smiling for captured image 410 is 0% because the captured image 410 is neutral facial expression. In this example, the first response data corresponds to the image 416 and the second response data corresponds to the image 412. The first level of cognitive engagement determined based on the image 416 is greater than the second level of cognitive engagement determined based on the image 412. The image 416 was collected while the vehicle system presents an off-road view, and the image 412 was collected while the vehicle system presents a track view. Thus, the present system determines that the user is more engaged with driving when driving an off-road, and recommends a vehicle suited for an off-road to the user after the test-driving.

As another example, each of the first level of cognitive engagement and the second level of cognitive engagement may be a percentage of time during which the driver faces forward. For example, during the test driving period of 600 seconds, if the driver faces forward for 540 seconds and faces different directions for 60 seconds, the percentage would 90 percent. If the driver faces forward for 570 seconds and faces different directions for 30 seconds, the percentage would 95 percent. As another example, each of the first level of cognitive engagement and the second level of cognitive engagement may be a level of pressure applied by the hand of the driver.

In some embodiments, the present system processes the first response data to determine a first level of cognitive engagement, processes the second response data to determine a second level of cognitive engagement, and determines a route of the vehicle from a first location to a second location based on a comparison of the first level of cognitive engagement and the second level of cognitive engagement. For example, the first response data was collected while the vehicle system presents a highway view, and the second response data was collected while the vehicle system presents a city view. The first level of cognitive engagement determined based on the first response data may be greater than the second level of cognitive engagement determined based on the second response data. Then, the present system determines a route of the vehicle from a first location to a second location that includes a highway. Specifically, the first location may be a current location of the vehicle and the second location may be a destination entered by the user. Then, the present system determines a suggested route from the first location to the second location that includes a highway along the route to enhance the user's driving experience.

In some embodiments, the present system determines one or more options or accessories of the vehicle based on the first response data and the second response data. The one or more options may be temperature settings, seat position settings, wiper speed settings, audio settings, adaptive cruise control settings, autonomous driving settings, and the like. For example, the first response data was collected while the vehicle cabin temperature was set at 75 degrees Fahrenheit, and the second response data was collected while the vehicle cabin temperature was set at 65 degrees Fahrenheit. If the first response data indicates positive responses from the user (e.g., positive facial expressions) and the second response data indicates negative responses from the user, the present system may set the default temperature of a new vehicle for the user at 75 degrees Fahrenheit. As another example, the first response data was collected while the vehicle is driving on a highway and the adaptive cruise control is on, and the second response data was collected while the vehicle is driving on a highway and the adaptive cruise control is off. If the first response data indicates positive responses from the user (e.g., positive facial expressions) and the second response data indicates negative responses from the user, the present system may turn on the adaptive cruise control when the vehicle is driving on a highway as a default setting. The preferred setting such as the temperature setting, adaptive cruise control setting, and the like, may be stored in a user profile of the user. Thus, when the user buys a new vehicle, the settings for the new vehicle may be determined based on the user profile of the user.

In some embodiments, the present system obtains first audio presented to a user, obtains, by one or more sensors of a vehicle, the first response data related to the response of the user while the first driving view and the first audio are presented to the user, obtains second audio presented to the user, and obtains, by the one or more sensors, the second response data related to the response of the user while the second driving view and the second audio are presented to the user. For example, each of the first audio and the second audio may be a certain genre of music or an audio from a certain radio station. Each of the first response data and the second response data may be user's voice. If the volume of the first response data is greater than the volume of the second response data, the present system sets the genre or radio station of the first audio as a default audio for the vehicle of the user. The audio setting may be also stored in the user profile of the user.

In some embodiments, the present system outputs a survey asking questions about current experience of a test driving to the user, and obtains responses from the user. The present system may output the survey when a certain condition is met. For example, the present system may output survey when the driver shows a certain facial expression, when the driver is distracted, when the driver is not holding a steering wheel, or the like. Each of the first response data and the second response data includes a response of the user to the questions. Based on the first response data and the second response data, the present system may determine a recommendation type of a vehicle.

While the above describes presenting two different views to a driver, more than two views may be presented to the driver, and user responses to more than two views may be collected and analyzed.

It should now be understood that embodiments described herein are directed to methods and systems for providing different driving experiences to a user using a virtual reality simulator. The present vehicle system includes a steering wheel, a windshield, one or more sensors, and a controller. The controller obtains a first driving view presented to a user via the windshield, obtains, by the one or more sensors, first response data related to a response of the user while the first driving view is presented to the user, obtains a second driving view presented to the user via the windshield, obtains, by the one or more sensors, second response data related to a response of the user while the second driving view is presented to the user, and determines a recommendation type of a vehicle for the user based on the first response data and the second response data. The present vehicle system captures emotional descriptors of a driver who is testing driving a vehicle and gauges the preferences of the user based on the captured emotional descriptors. The present vehicle system provides different driving experiences to the user in a cost-effective manner because the present vehicle system can easily switch displaying one view to another view and various views may be presented to the driver. In addition, the present vehicle system can automatically collect user responses to different views and/or settings in a short period of time in a limited area.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle system comprising: a steering wheel;

a windshield;

one or more sensors, wherein the one or more sensors include an in-vehicle camera; and a controller programmed to:

obtain a first driving view presented to a user via the windshield;

obtain, by the one or more sensors, first response data related to a response of the user while the first driving view is presented to the user;

process the first response data to determine a first level of cognitive engagement by:

determining whether the user is distracted and not paying attention to driving based upon a first amount of time the user faces forward during a first driving period, and determining a first level of smiling calculated using a first number of teeth shown in the first response data;

obtain a second driving view presented to the user via the windshield;

obtain, by the one or more sensors, second response data related to a response of the user while the second driving view is presented to the user;

process the second response data to determine a second level of cognitive engagement by:

determining whether the user is distracted and not paying attention to driving based upon a second amount of time the user faces forward during a second driving period, and determining a second level of smiling calculated using a second number of teeth shown in the second response data; and determine a route of the vehicle from a first location to a second location based on a comparison of the first level of cognitive engagement and the second level of cognitive engagement.

2. The system of claim 1, wherein the first driving view is a first simulated driving view displayed on a screen, and the second driving view is a second simulated driving view displaying on the screen.

3. The system of claim 2, wherein the controller is further programmed to:

determine whether an amount of the first response data is greater than a predetermined amount; and switch from displaying the first simulated driving view to displaying the second simulated driving view in response to determining that the amount of the first response data is greater than a predetermined amount.

4. The system of claim 1, wherein the first driving view is one of an off-road view, a track view, a highway view, a city view, a suburb view, a rural view, steep road view, a straight road view, and a curved road view, and the second driving view is another of the off-road view, the track view, the highway view, the city view, the suburb view, the rural view, the steep road view, the straight road view, and the curved road view.

5. The system of claim 1, wherein the controller is further programmed to:

determine a vehicle type recommendation based on the comparison of the first level of cognitive engagement and the second level of cognitive engagement.

6. The system of claim 1, wherein each of the first response data and the second response data includes at least one of gaze information of the user, facial expression information of the user, voice data, or body temperature data.

7. The system of claim 1, further comprising an external sensor configured to capture the first driving view and the second driving view external to the system.

8. The system of claim 1, wherein the controller is further programmed to determine one or more options or accessories of the vehicle based on the first response data and the second response data.

9. The system of claim 1, wherein the controller is further programmed to: obtain first audio presented to a user;

obtain, by the one or more sensors, the first response data related to the response of the user while the first driving view and the first audio are presented to the user;

obtain second audio presented to the user; and obtain, by the one or more sensors, the second response data related to the response of the user while the second driving view and the second audio are presented to the user.

10. The system of claim 1, wherein the controller is further programmed to output a survey asking questions about current experience of a test driving to the user, and each of the first response data and the second response data includes a response of the user to the questions.

11. A method comprising:

providing a vehicle to a user, the vehicle comprising at least one of a real vehicle and a vehicle simulator;

obtaining a first driving view presented to the user through a windshield of the vehicle;

obtaining, by one or more sensors, first response data related to a response of the user while the first driving view is presented to the user;

processing the first response data to determine a first level of cognitive engagement by:

determining whether the user is distracted and not paying attention to driving based upon a first amount of time the user faces forward during a first driving period, and determining a first level of smiling calculated using a first number of teeth shown in the first response data;

obtaining a second driving view presented to the user through the windshield of the vehicle; obtaining, by the one or more sensors, second response data related to a response of the user while the second driving view is presented to the user; and processing the second response data to determine a second level of cognitive engagement by:

determining whether the user is distracted and not paying attention to driving based upon a second amount of time the user faces forward during a second driving period, and determining a second level of smiling calculated using a second number of teeth shown in the second response data; and determining a route of the vehicle from a first location to a second location based on a comparison of the first level of cognitive engagement and the second level of cognitive engagement.

12. The method of claim 11, wherein the first driving view is a first simulated driving view displayed on a screen, and the second driving view is a second simulated driving view displaying on the screen, and wherein the method further comprises:

determining whether an amount of the first response data is greater than a predetermined amount; and switching from displaying the first simulated driving view to displaying the second simulated driving view in response to determining that the amount of the first response data is greater than a predetermined amount.

13. The method of claim 11, wherein the first driving view is one of an off-road view, a track view, a highway view, a city view, a suburb view, a rural view, steep road view, a straight road view, and a curved road view, and the second driving view is another of the off-road view, the track view, the highway view, the city view, the suburb view, the rural view, the steep road view, the straight road view, and the curved road view.

14. The method of claim 11, further comprising:

determining a vehicle type recommendation based on the comparison of the first level of cognitive engagement and the second level of cognitive engagement.

15. The method of claim 11, wherein each of the first response data and the second response data includes at least one of gaze information of the user, facial expression information of the user, voice data, or body temperature data.

16. The method of claim 11, further comprising:

determining one or more options or accessories of the vehicle based on the first response data and the second response data.

17. The method of claim 11, further comprising: obtaining first audio presented to a user;

obtaining, by the one or more sensors, the first response data related to the response of the user while the first driving view and the first audio are presented to the user;

obtaining second audio presented to the user; and obtaining, by the one or more sensors, the second response data related to the response of the user while the second driving view and the second audio are presented to the user.

* * * * *